(12) United States Patent
Tjaden

(10) Patent No.: US 10,113,291 B1
(45) Date of Patent: Oct. 30, 2018

(54) SUMP SYSTEM WITH OVERFLOW PROTECTION

(71) Applicant: STATE FARM MUTUAL AUTOMOBILE INSURANCE COMPANY, Bloomington, IL (US)

(72) Inventor: Richard Jan Tjaden, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 296 days.

(21) Appl. No.: 15/048,129

(22) Filed: Feb. 19, 2016

(51) Int. Cl.
*F04D 15/02* (2006.01)
*E02D 31/02* (2006.01)
*E04B 1/70* (2006.01)
*G05D 7/06* (2006.01)
*G06Q 40/08* (2012.01)

(52) U.S. Cl.
CPC ............ *E02D 31/02* (2013.01); *E04B 1/7023* (2013.01); *G05D 7/0676* (2013.01); *G06Q 40/08* (2013.01)

(58) Field of Classification Search
CPC .................. F04D 15/0218; F04D 13/16
See application file for complete search history.

(56) References Cited

U.S. PATENT DOCUMENTS

| | | | |
|---|---|---|---|
| 5,793,294 A | 8/1998 | Schepka | |
| 6,148,852 A * | 11/2000 | Osterman | E03F 5/22 137/391 |
| 6,854,479 B2 | 2/2005 | Harwood | |
| 8,435,009 B2 | 5/2013 | Moore et al. | |
| 8,474,477 B1 | 7/2013 | Melisz, Jr. | |

* cited by examiner

*Primary Examiner* — Thomas L Dickey
(74) *Attorney, Agent, or Firm* — Marshall, Gerstein & Borun LLP; Randall G. Rueth

(57) ABSTRACT

A sump system includes a flow restrictor for a drain line into a sump pit. The flow restrictor limits the water discharge capacity through the drain line into the sump pit. The flow restrictor is preferably sized and arranged to restrict the total maximum flow capacity of the drain line into the sump pit to match the maximum capacity output flow rate of the sump pump.

22 Claims, 9 Drawing Sheets

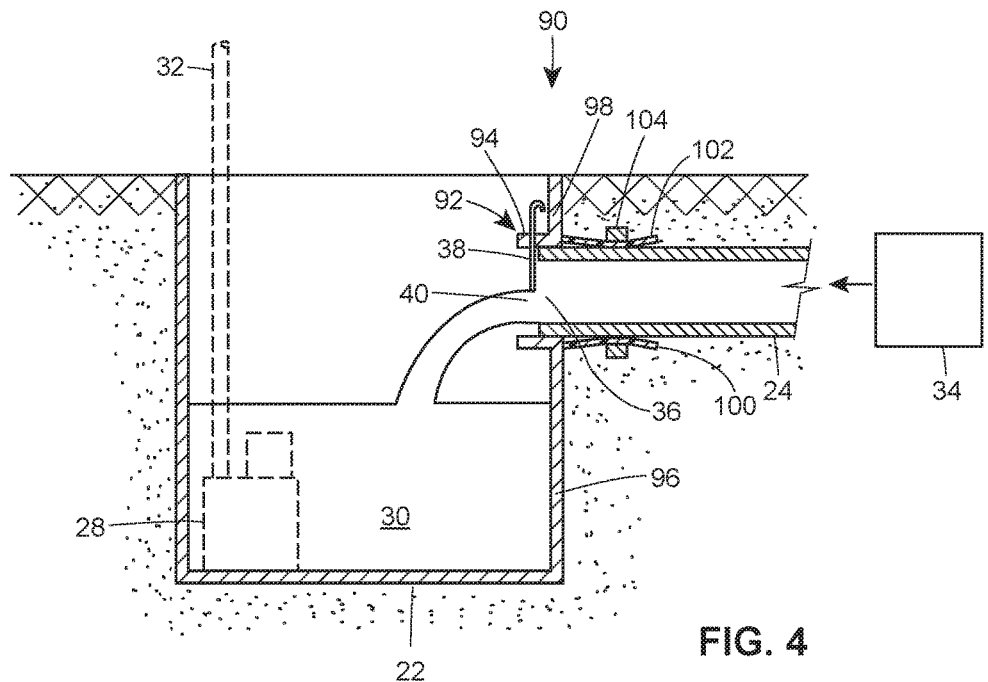
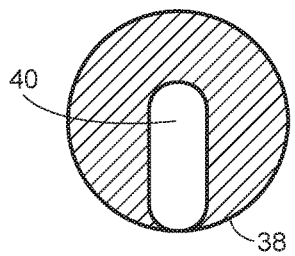
FIG. 5A
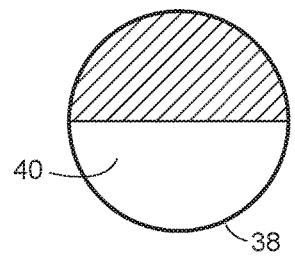
FIG. 5B
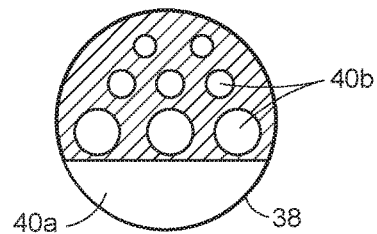
FIG. 5C

SUMP SYSTEM WITH OVERFLOW PROTECTION

FIELD

This application relates generally to a sump system, and more particularly to a system arranged to protect against overflow of a sump pit during intense rainfall events.

BACKGROUND

Sump systems are commonly used to collect and remove excess water from a given area. One of the most common uses of a sump system is to remove excess water from around the foundation and or basement regions of a building in order to prevent water from seeping into the basement regions and/or negatively impacting the loadbearing capacities of the footings. A common design includes a water drainage system extending along the footings of the building, such as a buried tile and/or water collection and flow channel that drains via a drain line into a sump pit recessed into the ground within the basement, preferably below the level of the footings. A sump pump is arranged to pump out the water collected within the sump pit, either continuously or, more commonly, when the level of the water within the sump pit reaches some maximum level. When the groundwater level around the foundation of the building rises above the level of the drainage system, the groundwater seeps into the drainage system, which directs the water to the drain line and into the sump pit, where the water is eventually ejected by the pump to a location remote from the building, such as a sewer system or drainage field. In this way, the sump system lowers the local groundwater level in the immediate area of the building foundation and/or the basement floor, which can prevent ingress of water into the basement and/or other problems associated with the elevated local groundwater level around the foundation and/or basement.

The expected parameters for functioning of such a sump system depends closely upon the normal conditions of the local groundwater level. For example, in many circumstances, the local groundwater level may normally be located below the level of the building foundations, and the local groundwater level may only temporarily rise above the level of the foundations or the ground surrounding the foundations may become temporarily saturated during rain events. This circumstance may cause temporary problems with ingress of water into the basement of the building. In this circumstance, a sump system need only function during such times that the local groundwater level or soil saturation surrounding the foundation and/or basement rises above the level of the basement. In other circumstances, the foundation and/or basement of the building may be disposed at or below the usual local groundwater level. In these circumstances, it is assumed that the sump pump will need to run substantially continuously, although it is still possible that the sump pump could run only intermittently, that is, it alternates between periods of pumping and periods of not pumping. The remaining discussion assumes a sump system that operates such that the sump pump runs intermittently.

Many sump systems encounter a problem when water enters the sump pump pit faster than it can be ejected by the sump pump. For example, during and immediately after an intense rainfall event, ground water drains into the drainage system and subsequently flows into the sump pit at an increased flow rate. Sometimes, when an extremely intense rainfall event occurs, the flow rate of water into the sump pit from the drainage system exceeds the capacity of the sump pump discharge rate. When this event occurs, the sump pump is overwhelmed with inflowing ground water. The sump pit then fills completely with excess water and overflows the rim of the sump pit even though the sump pump is fully functional. Such overflowing water may then spread across the basement floor, causing damage to items in the basement. Although rainfall events of such intensity are relatively rare, when they do occur, the maximum pumping capacity of the sump pump can be temporarily overwhelmed, and damage to property in the basement can result.

Various attempts to prevent the sump pump from being overwhelmed during an intense rainfall event have been made in the past. In one design, an alarm system provides a warning signal when the water in the sump pit rises above a predefined level. However, this design does not prevent an overflow from happening. In other designs, a secondary sump pump is installed in the sump pit and arranged to run only when the primary sump pump is overwhelmed. One such design includes also dividing the sump pit into a primary reservoir for the primary pump and a secondary reservoir for the secondary pump. However, these design require the complication and expense of adding a second pump and associated control systems, as well as often requiring additional structures to the sump pit. Yet further designs provide a water-tight cover sealed over the sump pit to prevent excess water from flowing out of the sump pit. However, these designs require extensive modifications to the sump pit and can create an excessive water pressure within the sump pit, which could lead to catastrophic failure of the cover. Therefore, it would be desirable to have a sump system that prevents overflow of the sump pit without requiring significant complicated alterations to the sump pit or additional pumps and control systems.

SUMMARY

According to some aspects of the disclosure, a sump system includes a flow restrictor mounted to a drain line into a sump pit by means of an adapter specific for one or various different piping configurations, wherein the flow restrictor limits the water discharge rate through the drain line into the sump pit. The flow restrictor may be sized and arranged to restrict the total maximum flow capacity of the drain line into the sump pit to match the maximum capacity output flow rate of a water removal system, such as a sump pump. In some sump system configurations where multiple drain lines discharge into one sump pit, multiple flow restrictors may be sized, coordinated, and arranged to restrict the total maximum flow capacity of the combined drain lines discharging into the sump pit to match the maximum capacity output flow rate of the water removal system. Preferably, the flow restrictor(s) restricts the maximum flow capacity of the drain line(s) into the sump pit to be equal to or less than the maximum capacity output flow rate of the water removal system. The flow restrictor(s) may thereby prevent water from overflowing the sump pit by preventing the inflow of water from exceeding the outflow of water from the water removal system, for example, during and immediately after intense rainfall events.

According to some aspects of the disclosure, the flow restrictor may have a minimum flow capacity before any restriction on the flow of water is restricted such that the flow restrictor cannot completely prevent water from flowing into the sump pit or completely stop or shut off flow of water through the drain line into the sump pit. In this manner, the flow restrictor does not form a dead head situation, i.e., a situation where water is not flowing at all, in drain line. This prevents the flow restrictor from accidentally or undesirably preventing flow of water into the sump pit, for example, under light to normal flow conditions.

According to some aspects of the disclosure, a flow restrictor may have any one or more of the following arrangements and/or features alone or in various combinations. The flow restrictor may mount to the drain line, for example at the discharge orifice of the drain line into the sump pit, with the aid of an adapter. The flow restrictor may include an orifice plate. Water may pass through an orifice defined by the orifice plate and through a plate holding fixture. The flow restrictor may include a cone restrictor. Water may pass around the cone restrictor and through a cone holding fixture. The adapter may have different arrangements adapted for different configurations of the drain line and/or the sump pit. The adapter may have the form of a plug adapter that inserts into the discharge orifice of the drain line, for example, into the inner diameter of the drain line. The adapter may have the form of a clamp or socket adapter that surrounds the outer periphery of the drain line at the discharge orifice. The adapter may clamp to the drain line. The restrictor and/or adapter may be integrated as a geometric feature of the sump pit. The flow restrictor and/or portions of an adapter may be integrated as a geometric feature of the drain line.

According to some aspects of the disclosure, a method of protecting a sump system from overflow during intense rainfall events includes installing a flow restrictor along a drain line extending from a water drainage system to a sump pit, wherein the flow restrictor is sized and arranged to restrict the total maximum flow capacity of the drain line into the sump pit to match the maximum capacity output flow rate of the sump pump.

According to some aspects of the disclosure, method of selecting a flow restrictor for a sump system and a software application is provided to assist in selection of an optimal flow restrictor for the drain line of such a sump system. The software application may be adapted to be installed and/or run by a smart phone.

According to some aspects of the disclosure, a method of determining insurance risks of an insurance consumer includes calculating a risk profile for the property or the insurance consumer based at least partly on a determination of whether a property to be insured by the insurance consumer has a sump system with a properly installed flow restrictor that matches output flow capacity of a drain line into a sump pit with a pump capacity of a sump pump for removing water from the sump pit.

Additional aspects, arrangements, features, and/or technical effects will become apparent upon detailed inspection of the figures and the following description.

BRIEF DESCRIPTION OF THE DRAWINGS

FIG. 4 is a schematic cross-sectional view of a sump system with a flow restrictor according to another exemplary aspect of the disclosure;

FIGS. 5A, 5B, and 5C are end views of exemplary orifice plates of FIGS. 1-3 with various exemplary shapes of an opening therethrough;

DETAILED DESCRIPTION

Figure 1A:
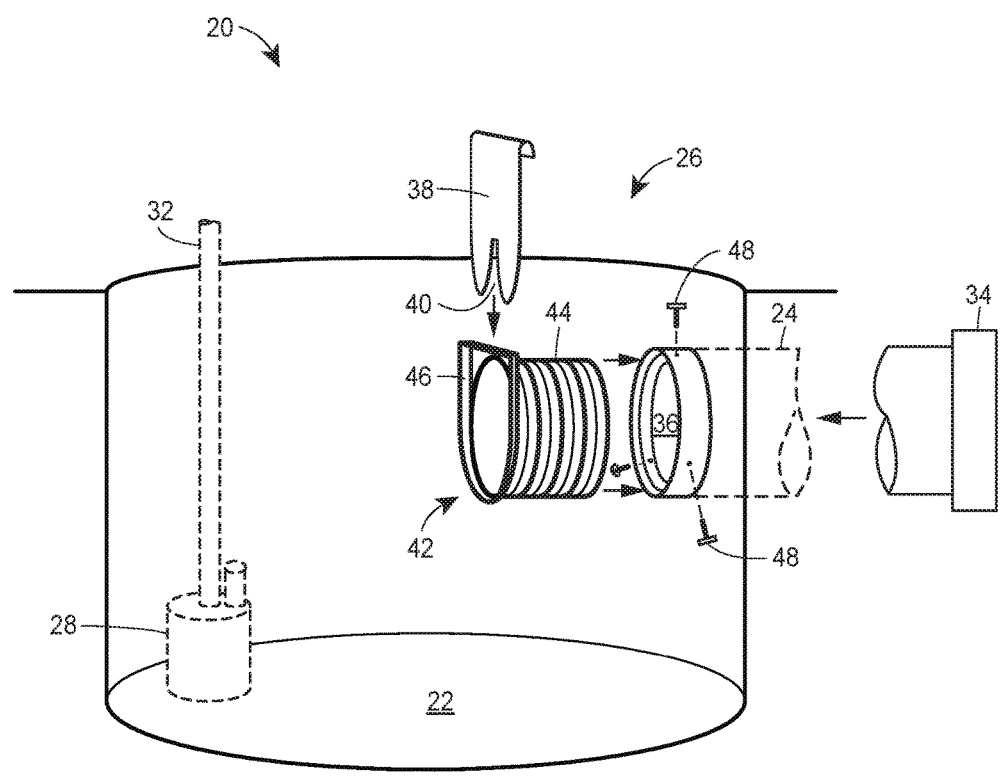
FIG. 1A is schematic exploded view of a sump system with a flow restrictor according to an exemplary aspect of the disclosure.

Before describing the specific examples of the drawings, some general aspects, arrangements, and features of the disclosed sump systems and associated methods are provided.

In some arrangements, a sump system, including a drain line having a discharge orifice leading into a sump pit and hydraulically coupled to a water drainage system to transfer water from the water drainage system into the sump pit, further includes a flow restrictor arranged to limit the water discharge rate through the drain line. The sump system may include a water removal system arranged to remove water from the sump pit, such as a sump pump that pumps water through a sump discharge line to a remote location. The flow restrictor is sized and arranged to restrict the total maximum flow capacity of the drain line into the sump pit to match, such as to be equal to or less than, the maximum capacity output flow rate of the water removal system, such as pump capacity of the sump pump. By adding such a flow restrictor to the sump system, excess drainage water flow that exceeds the capacity of the sump pump discharge rate, such as subsurface drainage water accumulating in a drain tile extending along the footings of a house or building during an intense rainfall event, backs up and fills up any available volume within the water drainage system, such as within the perimeter footing tile, on a temporary basis until such time as the water removal system can remove the excess water from the sump pit and the drainage system.

In some arrangements, a method of protecting a sump system from overflow during intense rainfall events includes installing a flow restrictor along a drain line extending from a water drainage system to a sump pit, wherein the flow restrictor is sized and arranged to restrict the total maximum flow capacity of the drain line into the sump pit to match, such as to be equal to or less than, the maximum capacity output flow rate of the water removal system. The flow restrictor may include any of the various arrangements and/or features of the various flow restrictors disclosed herein.

The flow restrictor may take various forms capable of restricting the maximum volume rate of flow of water through the drain line. In some arrangements, the flow restrictor may include an orifice plate that covers the discharge orifice of the drain line and restricts the flow of water from the drain line into the sump pit. The orifice plate may form an inverted weir. In some arrangements, the flow restrictor may include a restrictor cone that extends into the discharge orifice of the drain line and restricts the flow of water from the drain line into the sump pit. The restrictor cone may be disposed on a threaded rod. Rotating the restrictor cone in a first direction may advance the restrictor cone into the discharge orifice, and/or rotating the restrictor cone in a second direction may withdraw the restrictor cone out of the discharge orifice.

The flow restrictor may include an adapter for mounting the orifice plate or the restrictor cone across the discharge orifice of the drain line. In some arrangements, the adapter includes a plug section that fits into an end of the drain line. In some arrangements, the adapter includes a clamp that clamps around an exterior of the drain line. In some arrangements, the adapter includes a bolt flange that couples to an end of the drain line and a plate receiver coupled to the bolt flange. In some arrangements, the adapter includes a plate receiver that is an integral part of the sump pit, and an orifice plate is disposed in the plate receiver across the discharge orifice. In some arrangements, the flow restrictor may be integrated as a geometric feature of the drain line.

Preferably, the flow restrictor does not completely shut off or prevent flow of water through the drain line in order to not form a dead head of water within the drain line. Thus, the flow restrictor preferably has at least one opening disposed at the lowest level of the discharge opening of the drain line so that there is no minimum amount of water needed in order to discharge through the discharge opening.

The sump pit may take various forms suitable for collecting and holding water. For example, the sump pit may include a pit with a lining, such as a concrete lining or a plastic or PVC lining, a cistern, a hole in the ground with no lining, a buried tank, a tank above ground, or any other type of volume suitable for collecting and holding water to be pumped away by a sump pump. The sump pump may be any type of pump suitable for removing water from the sump pit. The sump pump may be, for example, a submersible pump to be disposed within the sump pit and to operate well submersed within water inside the sump pit. However, the sump pump need not be disposed directly inside the sump pit. Rather, the sump pump could be disposed exterior to the sump pit and be arranged to remove water from the sump pit via any suitable piping arrangement. Other arrangements of removing the water from the sump pit are also possible. In addition, the discharge orifice may be disposed hydraulically adjacent the sump pit, such that water discharged from the discharge orifice flows into the sump pit. For example, the discharge orifice may be disposed inside the sump pit, immediately adjacent the sump pit, or spaced from the sump pit along another transfer drain line or transfer channel that transfers water from the discharge orifice into the sump pit. The specific type of flow restrictor used with a particular sump system may be selected based on the type and arrangement of the sump pit, the sump pump, the location of the discharge orifice, and/or additional hydrodynamic characteristics of the sump system.

In some arrangements, the sump system may have a piping configuration where multiple individual drain lines discharge into a common sump pit. In this case, multiple flow restrictors may be sized, coordinated, and arranged to restrict the total maximum flow capacity of the combined drain lines discharging into the sump pit to match the maximum capacity output flow rate of the water removal system.

Figure 1B:
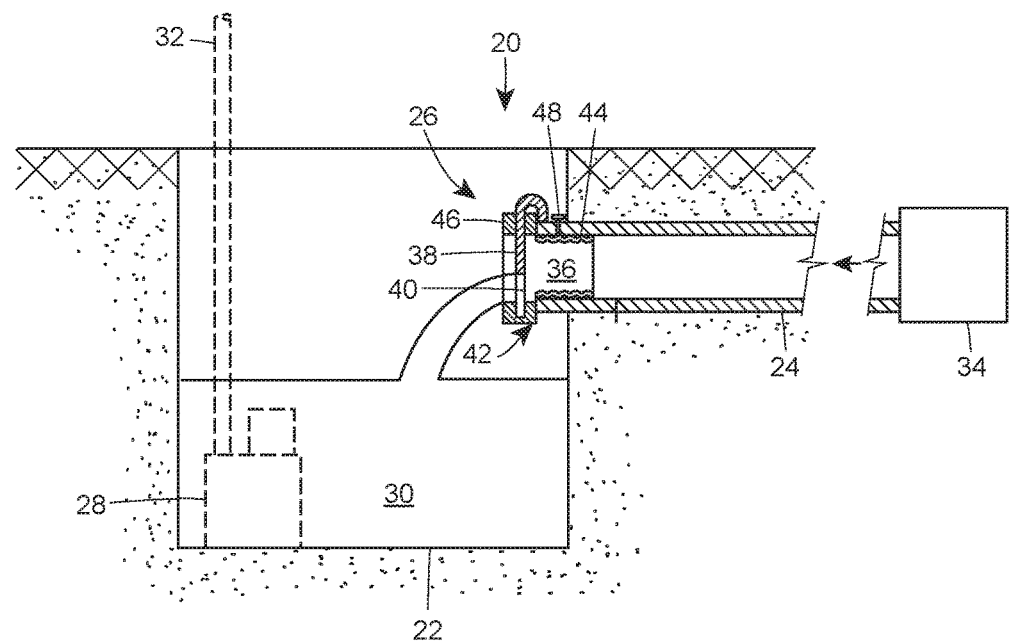
FIG. 1B is a schematic cross-sectional view of the sump system of FIG. 1A.

Turning now to the exemplary arrangements of the figures, FIGS. 1A and 1B illustrate a sump system 20 including a sump pit 22, a drain line 24, and a flow restrictor 26. The sump system 20 also may include a water removal system, such as a sump pump 28 that discharges water 30 from the sump pit 22 through a sump discharge line 32. The flow restrictor 26 restricts the flow of water discharged from the drain line 24 into the sump pit 22.

The drain line 24 is hydraulically connected to a water drainage system 34, such as a drainage tile or sand drain along the foundation of a house or other building. The drain line 24 may take any suitable form for transferring water from the drainage system to the sump pit 22 along a closed conduit. The drain line 24 receives water collected by the water drainage system 34 and directs the collected water into the sump pit 22 through a discharge orifice 36. The drain line 24 may be pipe, a tile, a hose, a conduit, or other similar type of generally closed passageway suitable for conducting water, preferably under pressure, from the water drainage system 34 into the sump pit 22. Similarly, the discharge orifice 36 may be the open end of the pipe, tile, hose, conduit, etc.

Figure 1C:
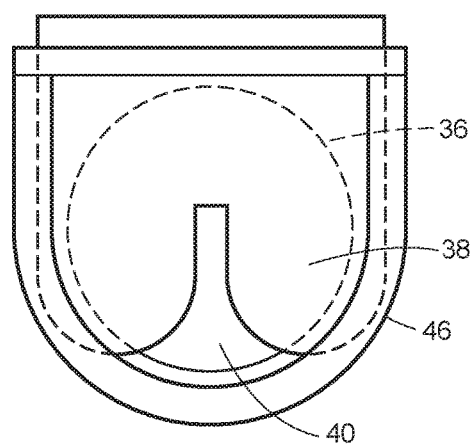
FIG. 1C is an end view of the flow restrictor of FIG. 1B.

The flow restrictor 26 includes an orifice plate 38 that partially but not completely closes the discharge orifice 36 so as to restrict the discharge flow capacity from the drain line 24 into the sump pit 22. The orifice plate 38 has one or more openings 40 that facilitate self-regulation of water flow rate from the drain line 24 into the sump pit 22 based upon the hydraulic head within the drain line 24 upstream of the orifice plate 38. The opening(s) 40 is smaller than (e.g., has a smaller cross-sectional area) the discharge orifice 36 and restricts the flow capacity of the drain line 24. The geometry of the opening(s) 40 results in a minimum flow capacity such that the flow restrictor 26 cannot completely prevent water from flowing into the sump pit 22 and create a complete shut-off, i.e., "dead head," condition inside the water drainage system 34. As best seen in FIGS. 1B and 1C, in the present arrangement, the orifice plate 38 forms an inverted weir, wherein when operatively disposed across the discharge orifice 36, the discharge plate 38 blocks upper portions of the discharge orifice and the opening 40 is disposed such that the hydraulically lowest portions of the discharge orifice 36 remain unblocked. The opening 40 has the shape of a modified triangle with curved sides and a curved bottom, thereby having a generally curvilinear triangular shape across the discharge orifice 36, such that the opening is widest at the bottom of the discharge orifice 36 and tapers inwardly along curvilinear sides to an apex in a central region of the discharge orifice 36. However, as discussed below, the orifice plate 38 may form openings 40 of many different shapes and sizes.

In this example, the flow restrictor 26 also includes an adapter 42 in the form of a plug that is inserted into the discharge orifice 36 of the drain line 24. The plug form may be particularly useful where the end of the drain line 24 projects out from the interior surface of the sump pit 22 only a small distance, as shown in FIG. 1, or even is flush or recessed back from the interior surface of the sump pit 22. The flow adapter 42 includes a plug section 44 and a plate receiver 46. The plug section 44 fits into the end of the drain line 24 and preferably has a an outer periphery that closely matches the inner diameter of the drain line 24, for example, having a friction fit with the inner diameter of the drain line 24. The plug section 44 is illustrated as a length of corrugated pipe having an outer diameter that matches the inner diameter of the drain line 24. However, the plug section 44 may take other forms that fit into the discharge orifice 36 and engage the inner diameter of the drain line 24. The plate receiver 46 is disposed on the distal end of the plug section 44 and forms a holding fixture for the orifice plate 38. The plate receiver 46 forms a slot into which the orifice plate 38 can be inserted and removed. In this arrangement, the plate receiver 46 is in the form of a frame secured to the end of the plug section 44, wherein the frame surrounds plug section 44 such that water can flow through the frame and defines the slot that slidingly receives the orifice plate 38. However, the plate receiver 46 may take other forms capable of receiving and coupling the orifice plate 38 to the plug section 44. The plug section 44 may be secured into the end of the drain line 24 by any suitable locking mechanism, such as with a friction fit, threads, welds, glue, etc. In the present example, the plug section 44 is secured in the end of the drain line 24 with clamps 48, such as bolts or screws, that are threaded through the wall of the drain line 24 and clamp against or are pinned through the outer wall of the plug section 44. The adapter 42 thus can be easily installed into an existing drain line 24, and different orifice plates 38 can be attached to the drain line 24 and/or the orifice plate can be easily removed and re-inserted if desired. Thus, the flow restrictor 26 may be particularly useful for retrofitting to a sump system and water drainage system 34 that has already been installed.

Other mechanisms for securing the orifice plate 38 across the discharge orifice 36 are also contemplated. In some arrangements, the orifice plate 38 may be attached directly to the end of the drain line 24, for example with a weld or adhesive. In some arrangements, the orifice plate 38 may be inserted through a receiver slot formed directly through the wall of the drain line 24.

FIGS. 5A-5C illustrate some additional possible exemplary shapes of the opening 40 in the orifice plate 38. In FIG. 5A, the opening 40 has the shape of a vertically oriented slot. Here, the slot has the shape of an elongate oval, however, in other arrangements, the opening 40 may have other shapes, such as a circle or parabola. The bottom end of the slot corresponds with the bottom of the drain line 24 (e.g., the invert of a pipe) and/or the frame of the plate receiver 46 such that the orifice plate 38 does not block water from draining from the lowest surface of the drain line 24. In FIG. 5B, the orifice plate 38 forms a straight, horizontal inverted weir, with the opening 40 corresponding to the lower portion of the discharge orifice 36 and the orifice plate 38 blocking the upper portion of the discharge orifice 36. In FIG. 5C, the orifice plate 38 covers the upper portion of the discharge orifice 36, forming a lower main opening 40a at the lower portion of the discharge orifice 36 and also includes secondary openings 40b through the plate above the main opening 40a, which can be selected to provide additional desired flow control characteristics at higher flow volumes. The opening 40 is not limited to any one of these shapes, and may have any shape, number, and/or arrangement desired to provide a desired flow capacity profile of water discharged from the drain line 24 into the sump pit 22.

Preferably, the flow restrictor 26 is selected to match the flow capacity of the drain line 24 to the capacity of the water removal system in a manner arranged to prevent overflow of the water 30 from sump pit 22 during, for example, an intense rainfall event, when properly installed. For example, the flow restrictor 26 may be selected so that the flow capacity of the drain line 24 is equal to or less than the pumping capacity of the sump pump 28. This is generally accomplished by sizing the opening(s) 40 such that the flow rate of water from the drain line 24 into the sump pit 22 under an expected pressure head from the water drainage system 34 is equal to or less than the maximum pumping capacity of the sump pump 28 and the sump discharge line 32 assembly. For example, an orifice plate 38 that forms a selected sized and arranged opening 40 can be selected and coupled to the drain line 24 either directly or with the adapter 42, as explained above.

In some configurations where more than one sump pump 28 is used to pump the water 30 from the sump pit 22, the flow restrictor 26 can optionally be sized to match the combined pumping capacity of the combined pumps or fewer than all the pumps. Similarly, in some configurations where multiple drain lines 24 discharge into the sump pit 22, flow restrictors 26 may be installed to each drain line 24. Preferably, the multiple flow restrictors 26 are sized and arranged in a coordinated manner so as to restrict the total maximum flow capacity of the combined drain lines discharging into the sump pit 22 to match the maximum capacity output flow rate of the sump pump 28.

In operation, as water from the water drainage system 34 collects in the drain line 24, the flow restrictor 26 limits the volume flow rate of water flowing into the sump pit 22 through the discharge orifice 36 such that rate of water flow into the sump pit 22 does not overwhelm the capacity of the sump pump 28. During a temporary high volume water event, such as an intense rain event, water may back up temporarily up the drain line 24 and into the water drainage system 34. However, since such high volume water events are generally of relatively short duration, once the event is over, the sump pump 28 can eventually discharge all of the water without the water 30 overflowing the sump pit 22 into, for example, the basement of a house. Thereby, the flow restrictor 26 provides a simple and relatively fail safe mechanism for delaying excessive water flow into the sump pit 22 and thereby preventing the water 30 from overflowing the sump pit 22.

Figure 2:
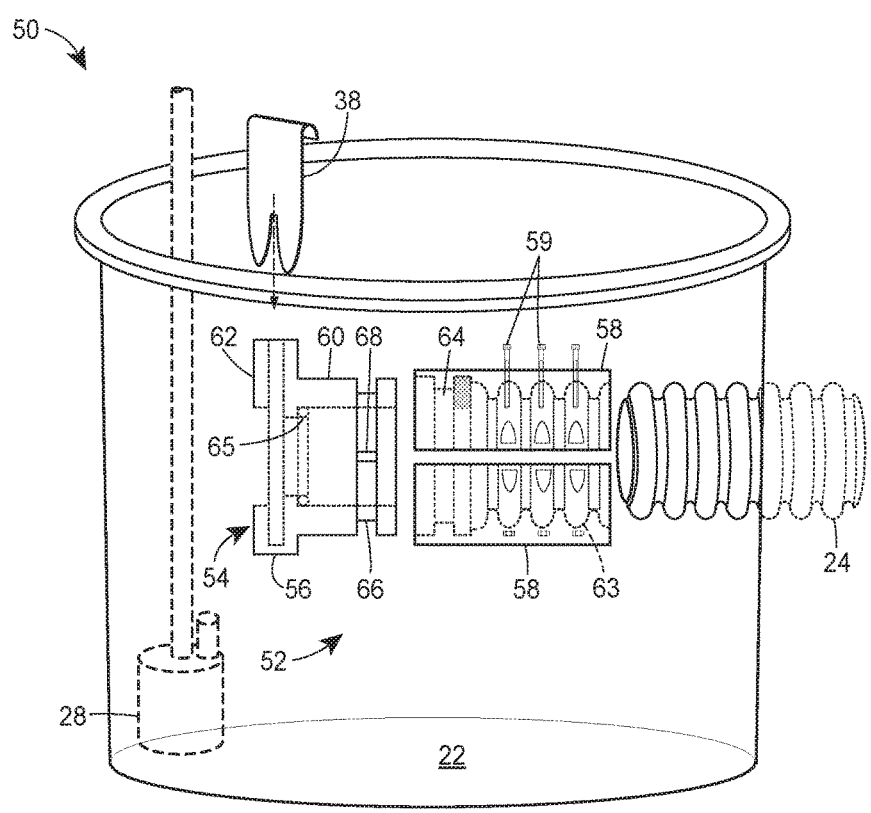
FIG. 2 is a schematic cross-sectional view of a sump system with a flow restrictor according to another exemplary aspect of the disclosure.

FIG. 2 illustrates a sump system 50 that is similar to the sump system 20, but wherein a flow restrictor 52 is arranged to fit over the end of the drain line 24, such as a pipe, rather than into the end of the drain line. The sump system 50 includes the sump pit 22, drain line 24, and sump pump 28 as previously described. Similar reference numbers are used for similar components, and reference is made to the previous detailed descriptions thereof. In the sump system 50, the flow restrictor 52 is used in lieu of the flow restrictor 26.

The flow restrictor 52 includes the orifice plate 38 and an adapter 54 for attaching the orifice plate to the drain line 24 around an exterior of the drain line and across the discharge orifice. The adapter 54 includes a plate receiver 56 that receives the orifice plate 38 and clamps 58 to mount the plate receiver 56 to the end of the drain line 24. The plate receiver 56 includes a pipe stub 60 that is approximately the same size as the discharge line 24 and a frame 62 through which water passes, mounted on the end of the pipe stub 60. The frame 62 forms a slot that slidably receives and holds the orifice plate 38 across the pipe stub 60. The orifice plate 38 may have the same form and any of the features previously described. The clamp 58 includes two opposing halves that fit around and clamp to the outer diameter of the drain line 24 and the outer diameter of the coupler pipe stub 60, for example with screws or bolts 59 that couple the two halves together around the outer surface of the drain line 24 and the pipe stub 60. In this particular arrangement, the clamp 58 includes an optional corrugated inner surface 63 that matches an optional outer corrugated surface of the drain line 24, which prevents the clamp 58 from pulling off of the end of the drain line 24. The clamp 58 also forms an inner annular ring 64 that fits into an outer annular groove 66 on the end of the pipe stub 60 to prevent the plate receiver 56 from pulling out of the end of the clamp 58. Optionally, a seal 65, such as a rubber flat washer, is carried within the flow restrictor against which the end of the drain line 24 can be sealed. Alternatively, the clamps 58 may be formed as a single socket that fits onto and around the end of the drain line 24.

The pipe stub 60 may include an anti-roll tang 68, such as a ridge or projection disposed in the outer annular groove 66. The anti-roll tang 68 is clamped between the two halves of the clamp 58 to prevent the plate receiver 56 from rotating axially within the clamp 58. Thus, the anti-roll tang 68 maintains the plate receiver 56, and thus the orifice plate 38, in a selected orientation, for example, with the opening 40 disposed across the bottom of the discharge orifice 36 (e.g., the invert of the pipe) in order to prevent back-up of water in the discharge line 24 under low flow conditions.

In this arrangement, the flow restrictor 52 may be particularly well suited for coupling to a drain line 24 where the end of the drain line 24 extends into the sump pit 22 and sticks out beyond the surface of the sump pit 22, as shown in FIG. 2. In addition, the flow restrictor 52 may be easily installed onto the end of the drain line 24 by simply clamping onto and over the exposed end of the drain line 24. Thus, the flow restrictor 52 may be particularly useful for retrofitting to a sump system and water drainage system 34 that has already been installed. Once installed, the flow restrictor 52 operates substantially the same as the flow restrictor 26, and reference is made to the previous description thereof.

Figure 3:
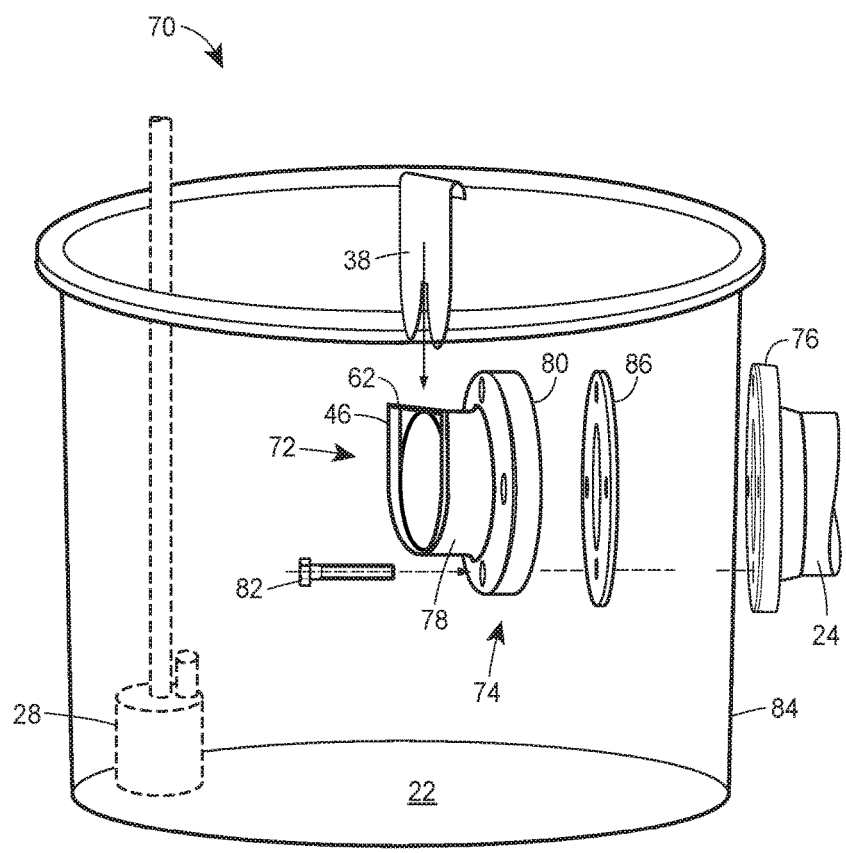
FIG. 3 is a schematic cross-sectional view of a sump system with a flow restrictor according to a further exemplary aspect of the disclosure.

FIG. 3. illustrates a sump system 70 that is generally similar to the sump system 20, but wherein a flow restrictor 72 includes the orifice plate 38 and an adapter 74 that bolts onto a bolt flange 76 on the end of the drain line 24. The orifice plate 38 may take any of the forms and/or features previously described herein. The sump system 70 includes the sump pit 22, drain line 24, and sump pump 28 as previously described. Similar reference numbers are used for similar components, and reference is made to the previous detailed descriptions thereof. In the sump system 70, however, the flow restrictor 72 is used in lieu of the flow restrictors 26 or 52.

The adapter 74 includes the plate receiver 46 disposed at one end of a pipe stub 78 and a second bolt flange 80 disposed at the opposite end of the pipe stub 78. The plate receiver 46 may be substantially similar as previously described, including the frame 62 attached to the end of the pipe stub 78 that forms a slot that receives the orifice plate 38. The second bolt flange 80 matches the bolt flange 76. Thus, the adapter 74 can be coupled to the end of the drain line 24 with bolts 82, and the orifice plate 38 can be inserted into the slot of the plate receiver 46, thereby restricting flow of water out of the discharge orifice 36 of the drain line 24 in a manner as already described previously herein.

In this arrangement, the bolt flange 76 is coupled to the end of the drain line 24 in any suitable manner, such as by welding, with adhesive, a threaded connection, etc. The bolt flange 76 may extend into the sump pit 22, in which case, the bolt flange 80 may bolt directly against the bolt flange 76. Alternatively, the bolt flange 76 may be disposed outside the side wall 84 of the sump pit 22, for example, where the sump pit 22 is formed with a pre-formed container or liner. In this case, the face of the bolt flange 80 may be contoured to match the surface of the side wall 84, for example the face of the bolt flange 80 may be curved to match a curved side wall 84. The face of the bolt flange 80 can be disposed against the inside surface of the side wall 84 with the bolt holes aligned with the bolt holes of the bolt flange 76, and the bolts 82 can extend through the bolt flanges 76 and 80 as well as the side wall 84 to couple the adapter to the drain line 24. Optionally, a gasket 86 may be disposed between the bolt flange 80 and the side wall 84 to prevent leakage of water out of the sump pit 22 around the bolt flange 80.

FIG. 4 illustrates a sump system 90 that is generally similar to the sump system 20, but wherein a flow restrictor 92 is formed as an integral component of the sump pit 22. The sump system 90 includes the sump pit 22, drain line 24, and sump pump 28 as previously described. Similar reference numbers are used for similar components, and reference is made to the previous detailed descriptions thereof. In the sump system 60, however, the flow restrictor 92 is used in lieu of the flow restrictors 26 or 52 or 72.

The flow restrictor 92 includes the orifice plate 38 and a plate receiver 94 that is incorporated as an integral part of the sump pit 22, for example, as an integral of a side wall 96 of a pre-formed plastic sump pit liner, or fiberglass sump pit liner, or a cast-in-place concrete sump liner. The orifice plate 38 may take any of the forms and/or features previously described herein. The plate receiver 94 is generally similar to the plate receivers 46 or 56, in that a frame defines a slot around the discharge orifice 36. Here, however, the plate receiver 94 is molded as an integral portion of the pre-formed plastic sump pit. The orifice plate 38 is inserted into the slot so as to form an inverted weir that partially covers at least an upper portion of the discharge orifice 36 without completely blocking off a lower portion of the discharge orifice 36.

The flow restrictor 92 may also include a receiver 98 and a coupler 100 for connecting to the drain line 24. The receiver may be a short socket or recess in the exterior surface of the side wall 96 of the sump pit that receives the end of the drain line 24. The coupler 100 may be used to couple the drain line 24 to the flow restrictor 92. The coupler 100 may take any form suitable for coupling the drain line 24 to the flow restrictor 92. For example, as illustrated in FIG. 4, the coupler 100 may include a flexible boot 102 surrounding the receiver 98 and coupled to the exterior of the side wall 96. The flexible boot 102 may be a short tube section made of rubber or plastic, for example. The end of the drain line 24 may be inserted into the boot 102 with the end seated against the orifice plate 38. A clamp 104, such as a band clamp, may clamp the boot 102 to the outer surface of the drain line 24 to prevent water from seeping from the sump pit 22 through receiver 98. However, other coupling arrangements may also or alternatively be used.

The flow restrictor 92 may be particularly desirable, for example, when first constructing and installing the drainage system 34 and the sump system 90. Once installed, the flow restrictor 92 operates substantially the same as the flow restrictors 26, 52, and 72, and reference thereof is made to the previous description thereof.

The flow restrictors of the present disclosure may take additional forms and are not limited to using the orifice plate 38. For example, the flow restrictors of the present disclosure may implement a cone restrictor in lieu of an orifice plate.

Figure 6:
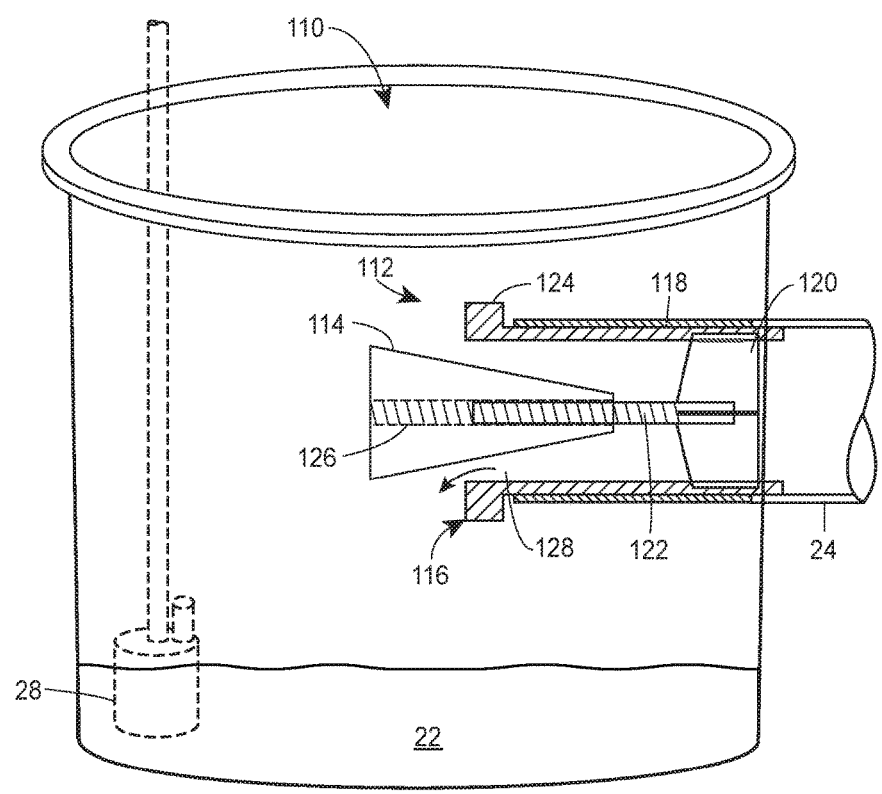
FIG. 6 is a schematic cross-sectional view of a sump system with a flow restrictor according to yet another exemplary aspect of the disclosure.

FIG. 6 illustrates a sump system 110 similar to the sump systems described previously, but with a flow restrictor 112 having a restrictor cone 114 rather than an orifice plate 38. The sump system 110 includes the sump pit 22, drain line 24, and sump pump 28 as previously described. Similar reference numbers are used for similar components, and reference is made to the previous detailed descriptions thereof.

The flow restrictor 112 includes the restrictor cone 114 and an adapter 116. The adapter 116 forms a holding fixture for the restrictor cone and operatively couples the restrictor cone 114 to the drain line 24. The adapter 116 includes a pipe section 118, support vanes 120, and a threaded rod 122. The pipe section 118 fits the end of the drain line 24, and is preferably sized to match the inner diameter of the drain line 24. The support vanes 120 extend radially inwardly from the inner surface of the pipe section 118 and support the threaded rod 122. In this arrangement, there are four support vanes 120. However, in other arrangements, the number of support vanes may be fewer or more than four. The threaded rod 122 extends along the axis of the pipe section 118 from the support vanes 120 toward a discharge end of the pipe section 118. The adapter 116, and particularly the pipe section 118 of the adapter, thereby forms a plug that is inserted into the end of drain line 24 and can be secured in the drain line by any suitable mechanism, such as with clamp bolts, welds, adhesive, etc. The adapter 116 may also include an outer radial flange 124 at the discharge end of the pipe section 118 to engage against the end of the drain line 24 and/or the side wall of the sump pit 22.

The restrictor cone 114 has a threaded bore 126 extending axially from the narrow end of the cone that threads onto the threaded rod 122 such that the restrictor cone 114 may be advanced along the threaded rod into the discharge end of the pipe section 118. When the adapter 116 is inserted into the end of the drain line 24, the restrictor cone 114 can be advanced toward and into the discharge end of the pipe section 118 to any selected position along the threaded rod 122. Water flowing from the drain line 24 flows through the pipe section 118 and around the outer surface of the cone restrictor 114, through an annular discharge opening 128 between the outer annular surface of the cone restrictor and the inner annular surface of the pipe section 118. The effective size of the annular discharge opening 128 can adjusted by advancing the restrictor cone 114 to different locations along the threaded rod 122. For example, the annular discharge opening 128 can be made smaller by advancing the restrictor cone 114 deeper into the pipe section 118, and the discharge opening 128 can be made larger by retracing the restrictor cone 114 further out of the pipe section 118.

The restrictor cone 114 preferably has a largest bell diameter that is smaller than the inner diameter of the pipe section 118. Thus, the restrictor cone 114 cannot completely close the annular discharge opening 128. This prevents the restrictor cone 114 from creating a "dead-head" condition inside the drain line 24. However, in other arrangements, the largest bell diameter of the restrictor cone 114 may match or even be larger than the inner diameter of the pipe section 118, in which case, it may be desirable to have one or more openings, such as axial channels, slots, grooves, notches, or holes along the outer surface of the bell in order to prevent complete closure of the annular discharge opening 128 that could cause a dead-head condition inside the drain line 24.

In some arrangements, the flow restrictor 112 may be easily installed onto the end of the drain line 24 by inserting the pipe section 118 into the end of the drain line 24. Thus, the flow restrictor 112 may be particularly useful for retrofitting to a sump system and water drainage system 34 that has already been installed. The plug form of the flow restrictor 112 may be particularly useful where the end of the drain line 24 is flush with the interior surface of the sump pit 22 or even recessed back from the interior surface of the sump pit 22. Once installed, the flow restrictor 112 operates to limit the flow capacity of the drain line 24 into the sump pit 22. In addition, the flow restrictor 112 is easily adjusted so as to be able to easily "tune" the flow capacity of the drain line 24 to match a given water removal system without having to change out the restrictor cone.

Figure 7:
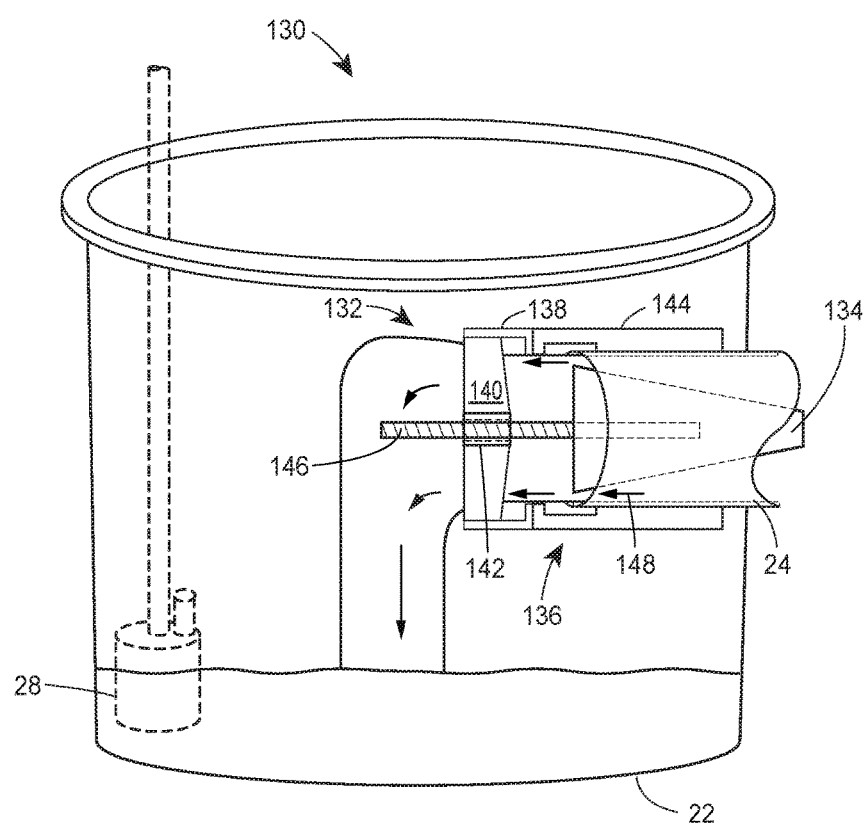
FIG. 7 is a schematic cross-sectional view of a sump system with a flow restrictor according to a still further exemplary aspect of the disclosure.

FIG. 7 illustrates a sump system 130 similar to the sump systems described previously, but with a flow restrictor 132 having a restrictor cone 134 and an adapter 136 that is arranged to clamp onto the exterior of the end of a drain line 24 rather than plug into the end of the drain line. The sump system 130 includes the sump pit 22, drain line 24, and sump pump 28 as previously described. Similar reference numbers are used for similar components, and reference is made to the previous detailed descriptions thereof.

The adapter 136 includes a collar 138, support vanes 140, a threaded bore 142, and a clamp 144. The collar 138 forms a holding fixture for the restrictor cone 134 and is preferably sized approximately the same as or slightly larger than the end of the drain line 24 to form an opening approximately the same size or slightly larger than the discharge orifice 36. The support vanes 140 project radially inwardly from the inner peripheral surface of the collar 138 and support the threaded bore 142 disposed centrally in the collar 138. In this arrangement, there are four support vanes 140, however more or fewer support vanes 140 may be used to support the threaded bore 142. The clamp 144 clamps around the outer periphery of the drain line 24, and may include, for example, upper and lower halves that are connected together by bolts or screws, similarly to the clamp 58. However, the clamp 144 may take other forms capable of clamping around the outer periphery of the drain line 24 near the end of the drain line. The collar 138 is coupled to the end the clamp 144 such that, when the clamp 144 is mounted to the end of the drain line 24, water flows through the collar 138 and the support vanes 140 are disposed adjacent to and on the exterior of the end of the drain line 24, and the threaded bore 142 is disposed centrally at the discharge orifice 36. Preferably the threaded bore 142 is aligned approximately along the longitudinal axis of the drain line 24. Alternatively, the clamps 144 may be formed as a single socket that fits onto and around the end of the drain line 24.

The restrictor cone 134 includes a threaded rod 146 that threads into the threaded bore 142. The threaded rod 146 extends axially from the larger diameter end of the restrictor cone 134. When the adapter 136 is clamped onto the end of the drain line 24 with the clamp 144, the threaded rod 146 is screwed into the threaded bore and supports the restrictor cone 134 extending into the discharge orifice 36 of the drain line 24 thereby forming an annular discharge opening 148 between the outer annular diameter of the discharge cone 134 and the inner annular surface of the drain line 24. Thus, the restrictor cone 134 restricts the size of the discharge opening 36.

The threaded connection between the threaded rod 146 and the threaded bore 142 allows the restrictor cone 134 to be advanced or retracted by rotating the threaded rod 146. Thus, the size of the annular discharge opening 148 may be adjusted by advancing or retracting the restrictor cone 134 relative to the end of the drain line 24. For example, the annular discharge opening 148 may be made smaller by advancing the restrictor cone 134 deeper into the end of the drain line 24, and the annular discharge opening 148 may be made larger by retracting the restrictor cone 134 further out of the end of the drain line 24.

The largest diameter of the restrictor cone 134 is preferably smaller than the inner diameter of the drain line 24. However, in other arrangements, the largest bell diameter of the restrictor cone 134 may match or even be larger than the inner diameter of the drain line 24, in which case, it may be desirable to have one or more openings, such as axial channels, slots, grooves, notches, or holes along the outer surface of the bell. This prevents the restrictor cone 134 from completely closing off the annular discharge opening 148 that could cause a dead-head condition inside the drain line 24.

In some arrangements, the flow restrictor 132 may be easily installed on the end of the drain line 24 by screwing the threaded rod 146 into the threaded bore 142 and then clamping the clamp 144 onto the end of the drain line 24. Thus the flow restrictor 132 may be particularly useful for retrofitting to a sump system and water drainage system 34 that has already been installed. Once installed, the flow restrictor 132 operates substantially the same as the flow restrictors previously described, and reference thereof is made to the previous description thereof.

The flow restrictors 112 and 132 may alternatively be incorporated as an integral part of a pre-formed sump liner. In one such an arrangement, for example, the support pipe section 118, support vanes 120, and threaded rod 122 may be formed integrally with the sump liner such that the drain line 24 may be connected to one end of the pipe section 118 and the restrictor cone 114 may be screwed onto the opposite end of the pipe section. In another arrangement, for example, the collar 138 may attach directly to a wall or pipe section that is integral with a wall of a sump liner. Other arrangements for adapting the flow restrictors 112 and 132 as integral portions of a pre-formed sump liner are also possible.

A method of protecting a sump system as described herein from overflow during intense rainfall events, may include installing a flow restrictor as disclosed herein along the drain line, wherein the flow restrictor is sized and arranged to restrict the total maximum flow capacity of the drain line into the sump pit to match the maximum capacity output flow rate of the water removal system. The method may also include selecting one of the flow restrictors disclosed herein based on the physical arrangement of the sump system and/or hydraulic characteristics of the drain line and/or the water removal system. For example, relative to the physical arrangement of the sump system, the selection and/or sizing may be based on whether the sump system, and particularly the drain line and the sump pit, are already installed or have yet to be constructed. The selection and/or sizing may be based on whether the discharge opening (e.g., the end of the drain line) extends outwardly beyond, is flush with, or is recessed back from the side wall of the sump pit. Relative to the hydraulic characteristics, the selection and/or sizing may be based on the volume flow rate output capacity of the drain line into the sump pit. The selection and/or sizing may be based on the pumping characteristics of the sump pump, such as the maximum volume flow rate discharge capacity. Additional factors may also be considered when selecting and/or sizing an appropriate flow restrictor for a given sump system arrangement.

Figure 8:
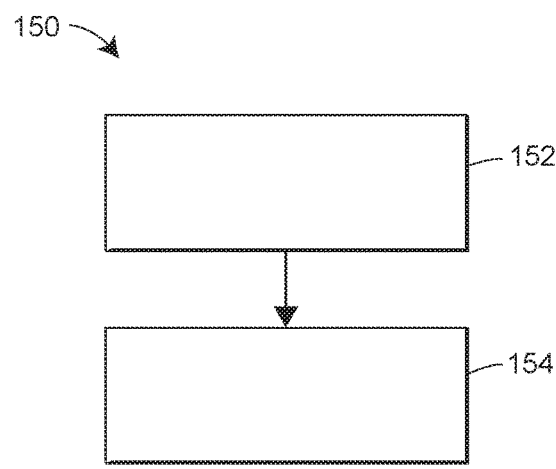
FIG. 8 illustrates a method of selecting a flow restrictor for a given sump system in accordance with another aspect of the disclosure.

Turning now to FIG. 8, an exemplary method of assembling a sump system according to the aspects and features described above may include a method 150 of selecting a flow restrictor for the sump system. The method 150 of selecting includes determining information relative to one or more of the make of the sump pump 28, model of the sump pump 28, horsepower of the sump pump 28, discharge height (e.g., the total dynamic head, TDH) of the sump pump 28, pump capacity of the sump pump 28, the size of the drain line 24, and/or arrangement of the drain line 24 (Block 152). After determining the information, the method 150 includes selecting a flow restrictor, 26, 52, 72, 92, 112, or 132 based on any one or more of the make, model, horsepower, and/or discharge height of the sump pump 28 and the size and arrangement of the drain line 24 (Block 154). Preferably, the flow restrictor is selected so as to provide an optimal fit and/or size to match output flow capacity of the flow restrictor with the pump capacity of the sump pump system. Criteria for matching output flow capacity of the flow restrictor with the pump capacity of the sump pump may be selected according to any of the criteria discussed herein.

In some aspects of the disclosure, a method of selecting a flow restrictor for a sump system and a software application encoded on a non-transient medium to be implemented by a computer processor for selecting a flow restrictor for a sump system is provided. The method may include determining a total discharge head of the water removal system, identifying the primary sump pump to determine performance information about the primary sump pump, calculating a head pressure of the drain line, determining a recommended size of a flow restrictor based at least in part on the total discharge head, the performance information of the primary sump pump, the head pressure, number and size of drain lines into the sump pit, and type of restrictor, and communicating the recommended size to a user. The software application may include instructions that cause the computer to implement the method on a computer processor. In some aspects, the software application is adapted to be run by a hand held computing device, such as a smart phone or tablet.

Figure 9:
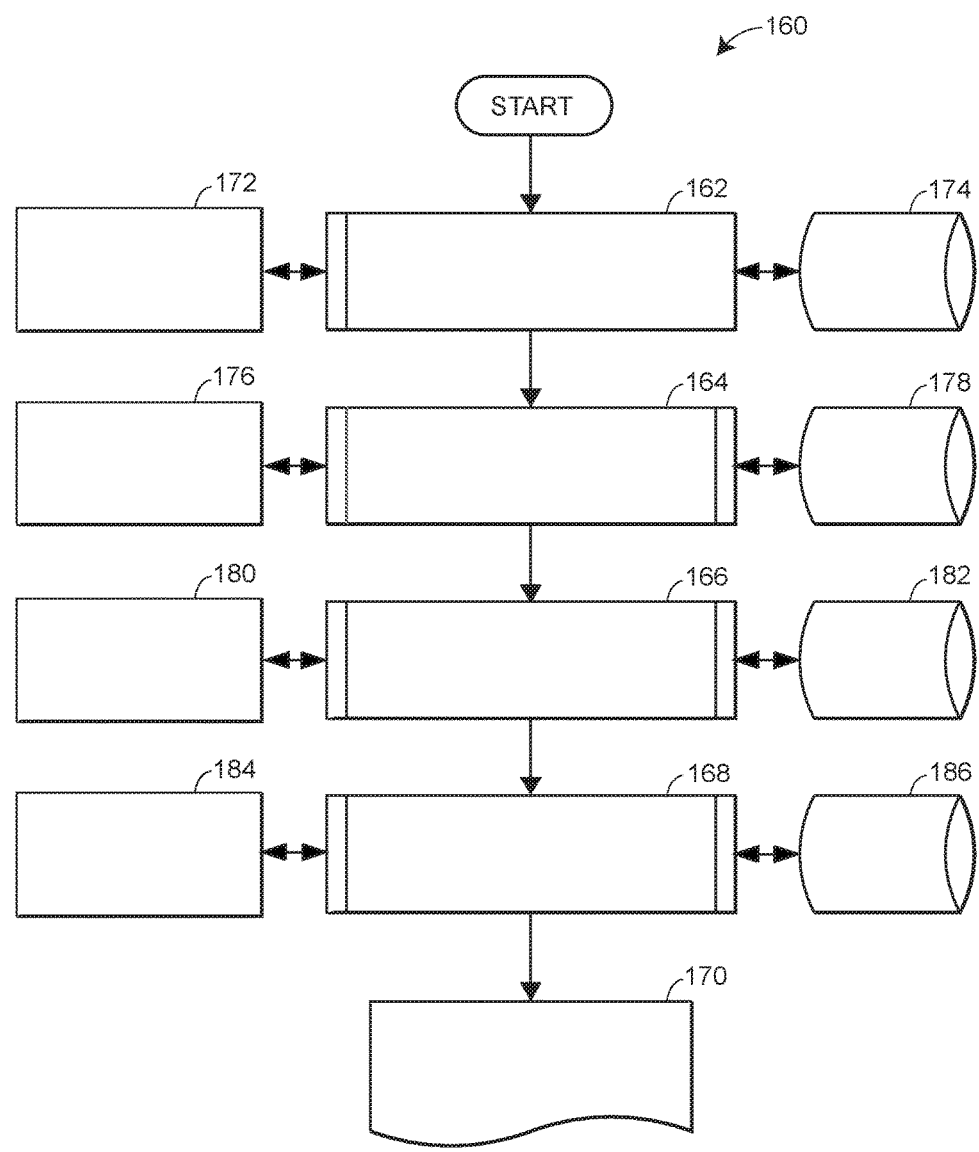
FIG. 9 is a logic flow chart relating to a computer program to assist in identifying an optimal flow restrictor for a given sump system in accordance with another aspect of the disclosure.

FIG. 9 shows an exemplary logic flow diagram for a software application 160 to be installed on and run by a computer processor, such as a program for a personal computer or a smart phone application, to assist in the selection of an optimal size and/or type of flow restrictor based on the input data. The software application determines a total discharge head of the water removal system for removing water from the sump pit 22 (Block 162). The water removal system may include, for example, the sump pump 28 and/or the sump discharge line 32. The water removal system may include additional and/or alternative sump pumps and/or associated water removal equipment. The software application determines the identity of a primary sump pump (Block 164). The primary sump pump may be a pump that is designed to provide primary pumping capacity of the water removal system, although a secondary or backup pump may be provided for providing alternative or additional pumping capacity, for example, in the event of an excessive water inflow surge and/or failure of the primary sump pump. The software application calculates a head pressure of the drain line 24 (Block 166). The software application determines a size for a flow restrictor (Block 168). Based on the determined size, the software application provides a recommendation to a user for a specific flow restrictor to use (Block 170).

A value for the total discharge head may be calculated from inputs and/or a value for the total discharge head may be input directly by a user, such as by an override function. To calculate the total discharge head (Block 162), one or more input values relative to one or more factors that influence the discharge head of the water removal system are input to the software application (Block 172). The factors may include one or more of: discharge lift height, discharge line size, discharge line material, number of elbow fittings, number of Y fittings, type of check valve, number of check valves, type of isolation valve, number of isolation valves. Additional or alternative factors may be considered, and values for such factors may be input to the software application accordingly. The input values may be input to the software application by a user directly and/or may be input from a database of values corresponding to predefined water removal systems and/or components thereof. The software application then calculates a value of the total discharge head of the water removal system from the input values for the factors. In one arrangement, the software module accesses a database 174 of pressure drop values corresponding to one or more of the input values to calculate the value of the total discharge head of the water removal system. The override function may be selected whereby calculation of the total discharge head may be bypassed or overridden if a value for the total discharge head is already known. To bypass or override the calculation, the known value of the total discharge head may be input directly to the software application. In this case, the software application may bypass the calculation and not perform the calculation and/or the software application may perform and then ignore any calculated value for the value of the total discharge head.

The identity of the primary sump pump may be determined to obtain performance information about the primary sump pump (Block 164). To identify the total primary sump pump, one or more input values relative to one or more factors that influence pump identification are input to the software application (Block 176). The factors may include one or more of: manufacturer of the primary sump pump, model number of the sump pump, horsepower of the sump pump, voltage of the sump pump. Additional or alternative factors may be considered, and values for such factors may be input to the software application accordingly. The software application then identifies the primary sump pump from the input values for the factors. In one arrangement, the software module accesses a database 178 of sump pumps corresponding to one or more of the input values to identify the primary sump pump. The database also includes performance information relative to and corresponding with each sump pump, such as the manufacturer's performance specifications. Identifying the primary sump pump may include accessing the performance information corresponding to the identified sump pump.

A value for the head pressure in the drain line 24 may be determined (Block 166) by calculating the value from inputs and/or a value for the drain line pressure may be input directly by a user, such as by an override function. To determine the head pressure in the drain line 24, one or more input values relative to one or more factors that influence the head pressure and/or flow rates are input to the software application (Block 180). The factors may include one or more of: height of finished grade above pipe invert of the drain line 24. Additional or alternative factors may be considered, and input values for such factors may be input to the software application accordingly. The input values may be input to the software application by a user directly and/or may be input from a database of values corresponding to predefined water removal systems and/or components thereof. In one arrangement, the software module accesses a database 182 of pressure values corresponding to one or more of the input values to calculate the value of the head pressure of the drain line 24. The override function may be selected whereby calculation of the head pressure may be bypassed or overridden if a value for the head pressure is already known. To bypass or override the calculation, the known value of the head pressure may be input directly to the software application. In this case, the software application may bypass the calculation and not perform the calculation and/or the software application may perform and then ignore any calculated value for the value of the head pressure.

A size for a flow restrictor, such as any one of the flow restrictors described herein, may be determined by calculations based on input values relative to water inflow into the sump pit 22 as well as the value of the total discharge head, the performance information corresponding to the identified sump pump, and the head pressure of the drain line (Block 168). One or more input values relative to one or more factors that influence selection of the flow restrictor are input to the software application (Block 184). The factors may include one or more of: number of drain lines 24 that discharge into the sump pit 22, size of each drain line 24 that discharges into the sump pit 22, type and/or schedule of pipe of each drain line 24 that discharges into the sump pit 22, type of flow restrictor desired (e.g., orifice or cone), and type of pipe adapter desired (e.g., interior or exterior). Additional or alternative factors may be considered, and input values for such factors may be input to the software application accordingly. The input values may be input to the software application by a user directly and/or may be input from a database of values corresponding to predefined water removal systems and/or components thereof. In one arrangement, the software module accesses a database 186 of performance values for flow restrictors that corresponding to one or more of the input values to determine the recommended size of the of the flow restrictor to recommend. The recommended size is selected such that the flow restrictor matches output flow capacity of the flow restrictor with the pump capacity of the water removal system.

After determining the recommended size of the flow restrictor, the software application 160 communicates the recommended size to a user (Block 170). The communication may include, for example, displaying the optimal flow restrictor on a screen or a paper printout, or sending a message, such as a text message, email, or audio message.

In some aspects of the disclosure, a method of offering insurance rates to insurance consumers is provided. The method may include determining whether a property to be insured by an insurance consumer has a sump system with a properly installed flow restrictor that matches output flow capacity of a drain line into a sump pit with a pump capacity of a sump pump for removing water from the sump pit. The method may include calculating a risk profile for the property and/or the insurance consumer at least partly based on the determination of whether the sump system has a properly installed flow restrictor. The risk profile of the property or the insurance consumer may be directly or indirectly correlated to the determination. For example, the calculation may include improving the risk profile (in other words, indicating that the risk of potential loss is lower) of the property and/or the insurance consumer if property has a sump system with properly installed flow restrictor that matches output flow capacity of a drain line into a sump pit with a pump capacity of a sump pump for removing water from the sump pit as disclosed herein.

Figure 10:
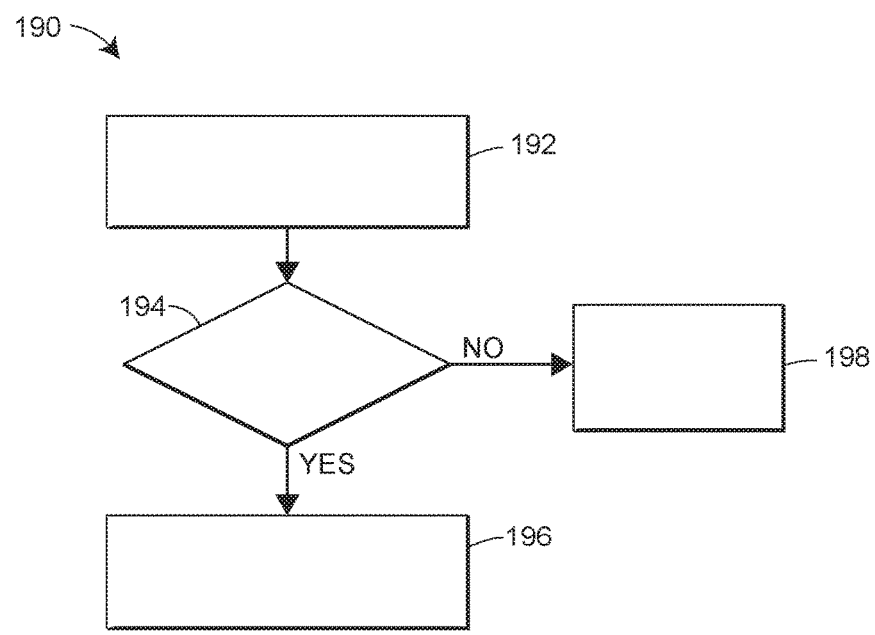
FIG. 10 illustrates a method of determining whether to provide a discount to an insurance consumer in accordance with another aspect of the disclosure.

FIG. 10 illustrates an exemplary method 190 of determining insurance risk of an insurance consumer, which, for example, may be used to calculate an insurance premium or other cost of insurance for the insurance consumer. In the method 190, information regarding the sump system and installation of any flow restrictor as described herein at a property to be insured by an insurance consumer is obtained (Block 192). The insurance consumer may be, for example, a policy holder or prospective policy holder of an insurance policy for the property to be insured. The obtained information from block 192 is analyzed to determine if the property to be insured has a sump system with a properly installed one of the flow restrictors sufficient to match the output flow capacity of a drain line into a sump pit with a pump capacity of a sump pump for removing water from the sump pit (Block 194). The criteria for matching may be in accordance with any of the similar criteria described herein. The method 190 includes calculating a risk profile for the property or the insurance consumer based at least partly on the determination. In one arrangement, calculating the risk profile includes adjusting the risk profile of the insurance consumer and/or the property based on whether or not property has a sump system with a properly installed (and matched) flow restrictor as disclosed herein. When the method 190 determines that the property to be insured does have a sump system with a properly installed flow restrictor (Block 194), the method 190 includes improving the risk profile of the property or the insurance consumer in response to that determination (Block 196). Alternatively, when the method 190 determines that the property to be insured does not have a sump system with a properly installed flow restrictor (Block 194), the method 190 includes worsening or leaving unchanged the risk profile of the property or the insurance consumer in response to that determination (Block 196). Of course, the risk profile of the property or the insurance consumer may be influenced by many other factors in addition to the determination at block 194. Therefore, the determination at block 194 may not directly correlate to a particular change in the risk profile, such as in a 1-to-1 ratio. Nevertheless, the determination at block 194 can still be a factor upon which the risk profile is based.

Insurance costs to the insurance consumer, such as premiums and deductibles, may be based at least partly on the risk profile. Thus, the method 190 may allow an insurance provider to logically and systematically determine whether to offer or provide a lower insurance cost to customers based on a lowered risk profile that may be at least partly influenced on whether the property to be insured has a properly installed flow restrictor in accordance with the teachings of the present disclosure.

Any of the flow restrictors disclosed herein may be used in combination with other sump pit 22 overflow protection arrangements. For example, the flow restrictors may also be installed and used with any of the types of arrangements discussed in the background section. Thus, while the flow restrictors may themselves provide a primary mechanism for an overflow protection arrangement for a sump system, the flow restrictors may also be one of several features of a sump system designed to prevent overflow of the sump pit 22.

While specific exemplary forms are illustrated and described herein, is to be understood that any of the various aspects, arrangements, and/or features disclosed herein may be combined with any one or more of the other aspects, arrangements, and/or features disclosed herein. This detailed description is to be construed as examples only and does not describe every possible embodiment, as describing every possible embodiment would be impractical, if not impossible. One could implement numerous alternate embodiments, using either current technology or technology developed after the filing date of this application.

I claim:

1. A method of protecting a sump system from overflow during intense rainfall events, wherein the sump system includes a drain line having a discharge orifice leading into a sump pit and hydraulically coupled to a water drainage system to transfer water from the water drainage system into the sump pit, and a water removal system arranged to remove water from the sump pit, the method including:

installing a flow restrictor along the drain line, wherein the flow restrictor is sized and arranged to restrict the total maximum flow capacity of the drain line into the sump pit to match the maximum capacity output flow rate of the water removal system, and wherein the flow restrictor does not completely shut off or prevent flow of water through the drain line and thereby does not form a dead head of water within the drain line.

2. A sump system, comprising:
a sump pit;
a drain line having a discharge orifice leading into the sump pit, the drain line being hydraulically coupled to a water drainage system and arranged to transfer water from the water drainage system into the sump pit; and
a flow restrictor that limits the water discharge rate through the drain line into the sump pit, wherein the flow restrictor comprises an orifice plate that covers the discharge orifice of the drain line and restricts the flow of water from the drain line into the sump pit.

3. The sump system of claim 2, wherein the orifice plate forms an inverted weir.

4. The sump system of claim 2, wherein the flow restrictor is integrated as a geometric feature of the drain line.

5. The sump system of claim 2, wherein the flow restrictor does not completely shut off or prevent flow of water through the drain line and thereby does not form a dead head of water within the drain line.

6. The sump system of claim 2, further comprising a water removal system, wherein the water removal system comprises at least one sump pump that pumps water out of the sump pit through a sump discharge line.

7. The sump system of claim 6, wherein the flow restrictor restricts at least one of:
a total maximum flow capacity of the drain line into the sump pit to match a maximum output flow rate capacity of the water removal system, or
a maximum flow capacity of the drain line into the sump pit to be equal to or less than the maximum output flow rate capacity of the water removal system.

8. A sump system, comprising:
a sump pit;
a drain line having a discharge orifice leading into the sump pit, the drain line being hydraulically coupled to a water drainage system and arranged to transfer water from the water drainage system into the sump pit; and
a flow restrictor that limits the water discharge rate through the drain line into the sump pit, wherein the flow restrictor comprises a restrictor cone that extends into the discharge orifice of the drain line and restricts the flow of water from the drain line into the sump pit.

9. The sump system of claim 8, wherein the restrictor cone is disposed on a threaded rod, and wherein rotating the restrictor cone in a first direction advances the restrictor cone into the discharge orifice, and rotating the restrictor cone in a second direction withdraws the restrictor cone out of the discharge orifice.

10. The sump system of claim 8, wherein the flow restrictor is integrated as a geometric feature of the drain line.

11. The sump system of claim 8, wherein the flow restrictor does not completely shut off or prevent flow of water through the drain line and thereby does not form a dead head of water within the drain line.

12. The sump system of claim 8, further comprising a water removal system, wherein the water removal system comprises at least one sump pump that pumps water out of the sump pit through a sump discharge line.

13. The sump system of claim 12, wherein the flow restrictor restricts at least one of:

a total maximum flow capacity of the drain line into the sump pit to match a maximum output flow rate capacity of the water removal system, or a maximum flow capacity of the drain line into the sump pit to be equal to or less than the maximum output flow rate capacity of the water removal system.

14. A sump system, comprising:

a sump pit;

a drain line having a discharge orifice leading into the sump pit, the drain line being hydraulically coupled to a water drainage system and arranged to transfer water from the water drainage system into the sump pit; and a flow restrictor that limits the water discharge rate through the drain line into the sump pit, wherein the flow restrictor comprises an adapter comprising at least one of:

a plug section that fits into an end of the drain line, at least one clamp clamped around an exterior of the drain line, and a bolt flange that couples to an end of the drain line and a plate receiver coupled to the bolt flange.

15. The sump system of claim 14, wherein the flow restrictor is integrated as a geometric feature of the drain line.

16. The sump system of claim 14, wherein the flow restrictor does not completely shut off or prevent flow of water through the drain line and thereby does not form a dead head of water within the drain line.

17. The sump system of claim 14, further comprising a water removal system, wherein the water removal system comprises at least one sump pump that pumps water out of the sump pit through a sump discharge line.

18. The sump system of claim 17, wherein the flow restrictor restricts at least one of:

a total maximum flow capacity of the drain line into the sump pit to match a maximum output flow rate capacity of the water removal system, or a maximum flow capacity of the drain line into the sump pit to be equal to or less than the maximum output flow rate capacity of the water removal system.

19. A sump system, comprising:

a sump pit;

a drain line having a discharge orifice leading into the sump pit, the drain line being hydraulically coupled to a water drainage system and arranged to transfer water from the water drainage system into the sump pit; and a flow restrictor that limits the water discharge rate through the drain line into the sump pit, wherein the flow restrictor comprises an adapter that is an integral geometric feature of the sump pit, and wherein the adapter comprises a plate receiver that is an integral part of the sump pit, and an orifice plate is disposed in the plate receiver across the discharge orifice.

20. The sump system of claim 19, wherein the flow restrictor does not completely shut off or prevent flow of water through the drain line and thereby does not form a dead head of water within the drain line.

21. The sump system of claim 19, further comprising a water removal system, wherein the water removal system comprises at least one sump pump that pumps water out of the sump pit through a sump discharge line.

22. The sump system of claim 21, wherein the flow restrictor restricts at least one of:

a total maximum flow capacity of the drain line into the sump pit to match a maximum output flow rate capacity of the water removal system, or a maximum flow capacity of the drain line into the sump pit to be equal to or less than the maximum output flow rate capacity of the water removal system.

\* \* \* \* \*